(12) United States Patent
Enayetullah

(10) Patent No.: US 8,758,953 B2
(45) Date of Patent: Jun. 24, 2014

(54) HIGH TEMPERATURE MEMBRANE ELECTRODE ASSEMBLY WITH HIGH POWER DENSITY AND CORRESPONDING METHOD OF MAKING

(75) Inventor: Mohammad Allama Enayetullah, Sharon, MA (US)

(73) Assignee: Trenergi Corp., Hopkington, MA (US)

( * ) Notice: Subject to any disclaimer, the term of this patent is extended or adjusted under 35 U.S.C. 154(b) by 65 days.

(21) Appl. No.: 13/052,896

(22) Filed: Mar. 21, 2011

(65) Prior Publication Data
US 2011/0244364 A1 Oct. 6, 2011

Related U.S. Application Data

(60) Provisional application No. 61/320,040, filed on Apr. 1, 2010.

(51) Int. Cl.
*H01M 8/10* (2006.01)

(52) U.S. Cl.
USPC .......................................... 429/487; 429/492

(58) Field of Classification Search
USPC .................. 429/487, 492, 535, 892
See application file for complete search history.

(56) References Cited

U.S. PATENT DOCUMENTS

| | | | |
|---|---|---|---|
| 4,447,506 A | 5/1984 | Luczak et al. | |
| 4,794,054 A | 12/1988 | Ito et al. | |
| 4,880,711 A | 11/1989 | Luczak et al. | |
| 5,096,866 A | 3/1992 | Itoh et al. | |
| 5,234,777 A | 8/1993 | Wilson | |
| 5,415,888 A | 5/1995 | Banerjee et al. | |
| 5,716,437 A | 2/1998 | Denton et al. | |
| 5,795,699 A | 8/1998 | Zhou et al. | |
| 5,958,197 A | 9/1999 | Allen et al. | |
| 6,007,932 A * | 12/1999 | Steyn | 429/456 |
| 6,020,083 A | 2/2000 | Breault et al. | |
| 6,057,054 A | 5/2000 | Barton et al. | |
| 6,180,163 B1 | 1/2001 | Artysiewicz et al. | |
| 6,326,098 B1 | 12/2001 | Itoh et al. | |

(Continued)

FOREIGN PATENT DOCUMENTS

WO 2008/038162 A2 4/2008
WO 2008/122893 A2 10/2008

(Continued)

OTHER PUBLICATIONS

D.S. Cameron et al., "Catalysts for Fuel Cell Applications: Future Availability and Management of Platinum", Platinum Metals Rev., 29(3), pp. 107-112 (1985).

(Continued)

*Primary Examiner* — Mark F Huff
*Assistant Examiner* — Monique Wills
(74) *Attorney, Agent, or Firm* — McCarter & English LLP

(57) ABSTRACT

A membrane electrode assembly (MEA) with enhanced current density or power density is fabricated using high temperature (HT) proton exchange membrane (PEM). The MEA can be utilized in high temperature PEM fuel cell applications. More specifically, the MEA is modified with the addition of one or more of selected materials to its catalyst layer to enhance the rates of the fuel cell reactions and thus attain dramatic increases of the power output of the MEA in the fuel cell. The MEA has application to other electro-chemical devices, including an electrolyzer, a compressor, or a generator, purifier, and concentrator of hydrogen and oxygen using HT PEM MEAs.

18 Claims, 3 Drawing Sheets

(56) References Cited

U.S. PATENT DOCUMENTS

| | | | |
|---|---|---|---|
| 6,602,630 B1 | 8/2003 | Gopal | |
| 6,749,892 B2 | 6/2004 | Chang | |
| 6,823,584 B2 | 11/2004 | Schaefer et al. | |
| 6,828,056 B2 | 12/2004 | Molter et al. | |
| 6,875,537 B2 | 4/2005 | Tani et al. | |
| 6,933,003 B2 | 8/2005 | Yan | |
| 7,029,559 B2 | 4/2006 | Won et al. | |
| 7,056,614 B2 | 6/2006 | Sugita et al. | |
| 7,419,741 B2 | 9/2008 | Vernstrom et al. | |
| 7,569,303 B2 | 8/2009 | Frank et al. | |
| 7,572,534 B2 | 8/2009 | Frey et al. | |
| 7,682,722 B2 | 3/2010 | Melzner et al. | |
| 7,727,651 B2 | 6/2010 | Kiefer et al. | |
| 7,993,499 B2 | 8/2011 | Zuber et al. | |
| 2002/0192540 A1 | 12/2002 | Kodas et al. | |
| 2005/0260485 A1 | 11/2005 | Sopchak et al. | |
| 2007/0026284 A1 | 2/2007 | Rhee et al. | |
| 2007/0248889 A1 | 10/2007 | Schmidt et al. | |
| 2008/0038613 A1 | 2/2008 | Padberg et al. | |
| 2008/0102338 A1 | 5/2008 | Son et al. | |
| 2008/0248944 A1 | 10/2008 | Thate et al. | |
| 2009/0155658 A1* | 6/2009 | Kotera et al. | 429/30 |
| 2009/0169955 A1 | 7/2009 | Uensal et al. | |
| 2010/0009234 A1 | 1/2010 | Stefener | |
| 2010/0323269 A1* | 12/2010 | Nakai et al. | 429/480 |
| 2012/0028163 A1* | 2/2012 | McGrath et al. | 429/482 |

FOREIGN PATENT DOCUMENTS

| | | |
|---|---|---|
| WO | 2008/131551 A1 | 11/2008 |
| WO | 2008/142570 A2 | 11/2008 |
| WO | 2009/013540 A2 | 1/2009 |

OTHER PUBLICATIONS

J. Zhang et al., "High Termpeature PEM Fuel Cells, Journal of Power Sources", 160(2), pp. 872-891 (2006).

Huang et al., "Catalyst Loading for PEMFC Electrodes prepared by Sputter Deposition", The Electrochemical Society, (2006), Abstract 264.

* cited by examiner

HIGH TEMPERATURE MEMBRANE ELECTRODE ASSEMBLY WITH HIGH POWER DENSITY AND CORRESPONDING METHOD OF MAKING

RELATED APPLICATION

This application claims priority to, and the benefit of U.S. Provisional Application No. 61/320,040, filed Apr. 1, 2010, for all subject matter common to both applications. The disclosure of said provisional application is hereby incorporated by reference in its entirety.

FIELD OF THE INVENTION

The present invention relates to enhancement of current density or power density of a membrane electrode assembly (MEA), and more particularly to modification of an MEA with the addition of one or more of selected materials to its catalyst layer to enhance the rates of the fuel cell reactions and thus attain increases of the power output of the MEA in the fuel cell.

BACKGROUND OF THE INVENTION

PEM fuel cells are well known in the art; as a power generation device, they convert chemical energy of fuels to electrical energy without their combustion and therefore without any environmental emissions. A PEM fuel cell like any electro-chemical cell of the stated categories, is formed of an anode and a cathode interposed by a layer of an electrolyte material for ionic conduction.

Embodiments of the conventional electro-chemical cell also include hardware components, e.g., plates, for reactant flow separation, current collection, compression and cooling (or heating). A separator plate provides multiple functions: (a) distributes reactant flow at the anode or cathode, (b) collects electrical current from operating anode/cathode surface and (c) prevents mixing or cross-over of the anode and cathode reactants in single cells. An assembly of two or more of these single cells is called a stack of the electro-chemical device. The number of single cells in a fuel cell stack is generally selected based on a desired voltage of the resulting stack. Conventionally desired voltages include 12 volts, 24 volts, 36 volts, 120 volts, and the like. For convenient assembly and/or dis-assembly of a fuel cell stack with large voltage or power output, multiple sub-stacks or modules, are combined to form the stack. The modules represent stacks of single cells in some number less than what ultimately results in the completed stack, as is well understood by those of skill in the art. When the stack forms a PEM fuel cell, such a module is often referred to as a PEM stack.

In the membrane electrode assembly (MEA) fuel (e.g., hydrogen) and oxidant (e.g., oxygen or air) react at the interfacial structures of the MEA to generate electrical power. Current HT MEAs are fabricated using a specific type of PEM material that contains phosphoric acid in its polymer matrix structure. The host matrix in the high temperature PEM material is thus a high temperature polymer material in which concentrated phosphoric acid is infused, and which is responsible for the proton conduction of the high temperature (e.g., 120° C. to 200° C.) PEM fuel cells. These HT PEM materials thus allow the fuel cell to operate at temperatures typical of phosphoric acid fuel cell (PAFC) operation (e.g., up to 200° C.) that are much higher than that of conventional low temperature PEM fuel cell operation (about 80° C.), which is typically well below 100° C.

While high temperature operation brings in a number of benefits, including but not limited to carbon monoxide (CO) tolerance, useful quality heat, fuel cell system simplification, and the like, the current (or power density per unit area) of the MEA is drastically reduced as compared to low temperature PEM MEAs, such as, e.g., MEAs made with Nafion® by E. I. du Pont de Nemours and Company. The power density per unit area of the MEA is reduced primarily due to intrinsic slow kinetics of oxygen reduction at the catalyst (typically Platinum)-phosphoric acid interface. More specifically, historical MEA technology development was targeted to the conventional low temperature PEM fuel cells in which the PEM material was Nafion® or equivalent perfluoro sulfonic acid ionomers. Addition of these ionomer materials in the interfacial structure of MEAs has been utilized to enhance the power output of MEAs (e.g., S. srinivasan et al., J Power Sources, 22,359, 1988/29,367, 1990 and Mahlon S. Wilson et al., J. Electrochem. Soc., Vol. 139 No. 2, 1992). In U.S. Pat. No. 5,272,017, a proton conducting material was used to make a slurry of carbon supported catalyst particles; the slurry was applied to opposed surfaces of the PEM, which was then hot-pressed to embed at least a portion of the particles into the membrane. In a similar example in U.S. Pat. No. 5,882,810, the active layer of the MEA contained catalytically-active particles and an ionomer with lower equivalent weight than that of the PEM material itself. In yet another example, in U.S. Pat. No. 6,287,717 B1, an electrode comprising catalytically active metal particles and an ionically conductive polymer (ionomer) was bonded to an ionically conductive polymer membrane to form an electrode-membrane interface.

Current technology for high temperature MEAs containing phosphoric acid in the polymer matrix does not include addition of any ionomer in the catalyst layer. However, different acidic materials including perfluorinated sulfonic acid have been used as additives in the body of high temperature PEM membranes, particularly to enhance their proton conductivity.

SUMMARY

There is a need for an MEA having significantly enhanced power density per unit area of the MEA relative to current high temperature PEM MEA technology. The present invention is directed toward further solutions to address this need, in addition to having other desirable characteristics.

In accordance with one example embodiment of the present invention, an MEA is formed with enhanced kinetics of the cathode reaction at the high temperature PEM-catalyst interface of a fuel cell MEA. Presence of an ionomer or a perfluoroacid in the body of the membrane would be expected to have some exposure to the interfacial area, and thus may have positive effects on the reaction kinetics due to its high oxygen solubility and weak anion adsorption on catalyst surface. However, to avail the fullest benefit of an ionomer or other additive material(s), the present invention makes use of such additive(s) in the catalyst layer of the MEA. In accordance with one example embodiment of the present invention, the enhanced kinetics is accomplished by placing a selected additive material (or materials) at the PEM-catalyst layer interface (the interface between the PEM and the anode and cathode electrodes). The additive material (or materials) creates a more reactive interface with the catalyst (Pt or Pt-alloy) for faster oxygen reduction kinetics. The additive material (or materials) can be solid or liquid but must be stable at the desired fuel cell operating temperatures (e.g., 120° C. to 200° C.). The amount of the additive material in the catalyst layer is in the range of 1% to 15% of the catalyst weight.

In accordance with one embodiment of the present invention, the additive material(s) may alternatively have a nano-structural characteristic and/or wetting behavior with respect to phosphoric acid present in the high temperature PEM matrix; wetting enlarges the three-phase interface area where the oxygen reduction takes place. This type of material must also be highly stable at temperatures of 120° C. to 200° C. and preferably be available at low-cost. Example additive materials fitting these requirements include, but are not limited to, selected acids, oxides, and oxyacids, acid salts including phosphates, sulfates, carbides, silicates, selected fluoropolymers, ionomers (including, e.g., Nafion® or equivalent PEM materials), and the like, with further details and additional example materials included herein as further described below.

In accordance with another aspect of the present invention, the high temperature PEM MEA is fabricated with a modified interfacial structure. The MEA is fabricated by co-depositing the additive material(s) with the catalyst particles at the electrode surface using any suitable coating techniques (e.g., spray-coating or printing using the catalyst ink). Those of skill in the art will appreciate that the present invention is by no means limited to the specific coating techniques described herein. Rather, any coating technique allowing the co-deposit of the additive material(s) with catalyst particles can be utilized, and is anticipated for use in accordance with the present invention.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to an MEA having significantly enhanced power density per unit area of the MEA relative to known high temperature PEM MEAs, and a corresponding method of making. More specifically, current high temperature PEM MEAs have a power density per unit area of, for example, 120-150 mW/cm$^2$ at 0.67V with ambient pressure H$_2$/Air operating at 180° C. The MEA of the present invention has a power density per unit area of about 200 mW/cm$^2$ at 0.67V with ambient pressure H$_2$/Air operating at 180° C. This is achieved by co-depositing with the catalyst particles an additive (or additives) having desired reactionary properties as described herein into a layer when forming the MEA. The additive material(s) can also be a nano-structural material of an organic or inorganic acid, or acid salt, phosphates, sulfates, carbides, silicates, and the like, in addition to other materials further described herein, and their equivalents.

Figure 1:
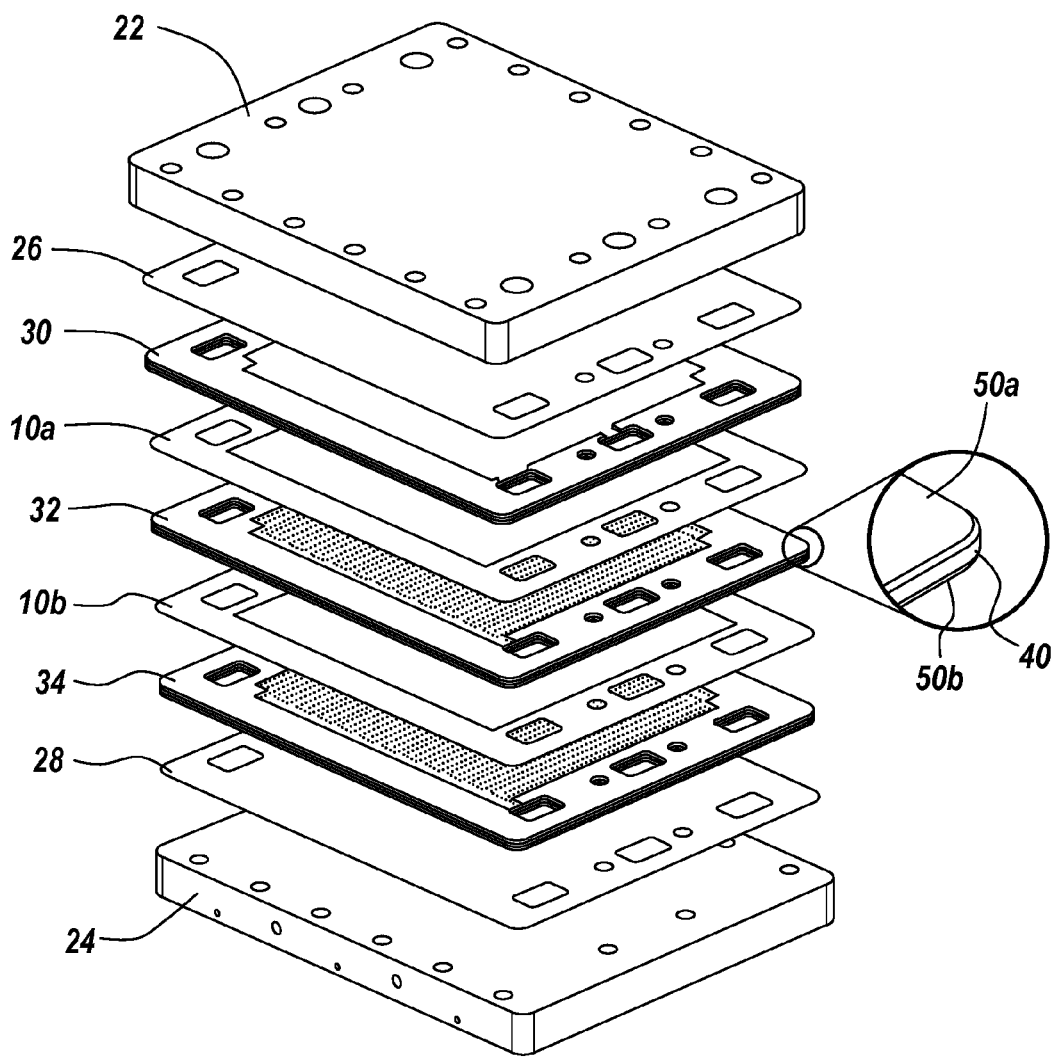
FIG. 1 is an exploded view of a fuel cell stack, according to one aspect of the present invention.

FIG. 1 is an expanded view of a fuel cell stack 20 in accordance with one example embodiment of the present invention. First and second compression plates 22, 24 form the top and bottom plates. Adjacent the compression plates 22, 24 are current collector plates 26, 28. An insulator laminate can be provided between the compression plates 22, 24 and the current collector plates 26, 28 as would be well understood by one of skill in the art. Adjacent the collector plates are a plurality of support plates and MEAs. As shown in the figure, there is a first support plate, 30, a second support plate 32, and a third support plate 34. Sandwiched between each support plate is an MEA 10. As shown in the figure, there is a first MEA 10a, and a second MEA 10b. The support plate 30, 32, 34 includes a first seal 50a and a second seal 50b, each positioned on opposing sides of a supporting plate 40. The first and second seals 50a, 50b, are adhered to the supporting plate 40 to form each of the first, second, and third support plates 30, 32, 34. The seal 50a, 50b is affixed on each side of the support plate 30, 32, 34, and is configured for sealing against the MEA 10 (10a, 10b), or the current collector plates 26, 28 with compression. Those of skill in the art will appreciate that other configurations of fuel cell stacks exist. As such, the present invention is by no means limited to the illustrative embodiment shown in FIG. 1. Rather, any fuel cell stack making use of an MEA 10 (10a, 10b) as described herein is anticipated for use in accordance with the present invention.

The description provided herein provides an illustrative example of a membrane electrode assembly having an additive (or additives) co-deposited with a catalyst thereon, and corresponding method of manufacture, according to the present invention. Although the present invention will be described with reference to the example embodiment, it should be understood that many alternative forms can embody the present invention. One of skill in the art will additionally appreciate different ways to alter the parameters of the embodiments disclosed, such as the size, shape, or type of elements or materials, in a manner still in keeping with the spirit and scope of the present invention.

Two conventional methodologies for membrane electrode assembly (MEA) fabrication are: (a) application of the catalyst particles on a conductive support surface or electrode and then bonding the catalyzed electrode with PEM surface to create the membrane-electrode interface, and (b) application of the catalyst particles on the PEM surface directly to fabricate the catalyst-coated membrane (CCM) and then attaching or bonding the conducting electrode material (electrode with gas diffusion layer, GDL) with the CCM surface to form the MEA.

With respect to the present invention, the process of catalyst-coated membrane (CCM) fabrication is relatively more cumbersome using phosphoric acid infused high temperature proton exchange membrane (HT PEM). As such, manufacture of the MEA in accordance with the present invention can be done in a more similar fashion to the first method described above, namely, application of catalyst particles on a conductive surface or electrode, which is then bonded to the proton exchange membrane (PEM) surface to create the MEA.

However, the method of manufacture in accordance with the present invention differs from the conventional method. In accordance with the present invention, an additive (or additives) is co-deposited with the catalyst particles onto the electrode surface using any suitable coating techniques (e.g., spray-coating or printing using the catalyst ink). One of skill in the art will appreciate that there are multiple different coating technologies that can be used to apply the additive and catalyst particles to the electrode. As such, the present invention is by no means limited only to those described herein. Rather, it is the co-depositing of the additive(s) with the catalyst that is relevant, and any coating method capable of such co-depositing methodology is anticipated for use with the present invention.

Figure 2:
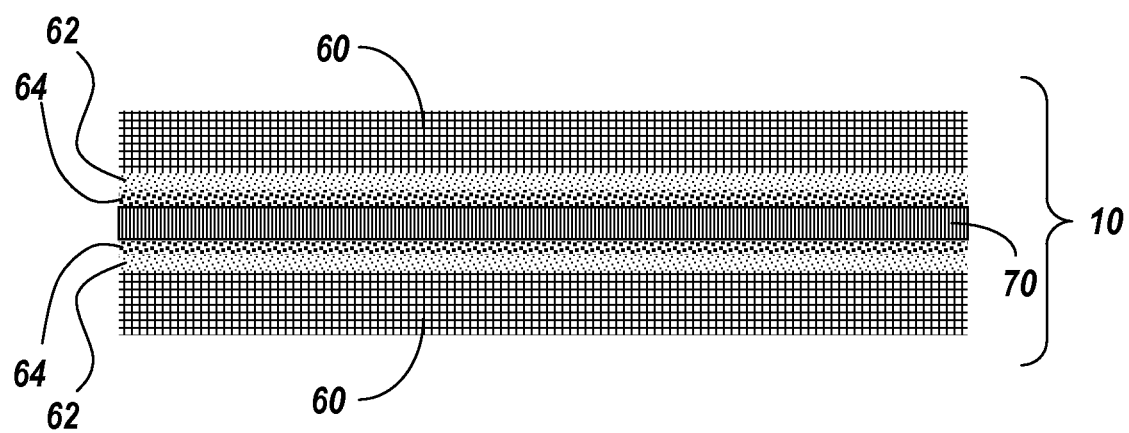
FIG. 2 is a cross-sectional illustration of an MEA in accordance with one aspect of the present invention.

The result of the manufacturing process is illustrated in FIG. 2, which shows a cross-sectional view of an MEA 10, in accordance with one embodiment of the present invention. The MEA 10 is formed of a proton exchange membrane (PEM) 70. An electrode support layer 60, typically formed of carbon-based material (e.g., carbon fabric or paper), is placed against the membrane 70 and typically bonded using heat in a process known to those of skill in the art. Between the membrane 70 and the electrode support layer 60, a layer of carbon 62 may optionally be added. The electrode support layer 60 and, if added, the carbon layer, are often referred to as a gas diffusion layer. In addition, a catalyst layer 64 is provided, which may contain Teflon® (made by E. I. du Pont de Nemours and Company) as a binder material. In accordance with the present invention, the catalyst layer 64 includes a catalyst and an additive (or additives) in addition to the binder material. As representative examples, the materials forming these layers include a carbon-based material for the electrode support layer 60, phosphoric acid infused high temperature proton exchange membrane 70, and a mixture of platinum catalyst and additive(s) for the catalyst layer 64. However, as further described herein, and as would be understood by those of skill in the art, the specific materials used for each layer of the MEA 10 can vary depending on preferences and desired characteristics of the resulting MEA 10. As such, the present invention is by no means limited to these specific materials described in the representative example.

More specifically with regard to the additive material(s), the additive material(s) creates a more reactive interface with the Pt or Pt-alloy catalyst for faster oxygen reduction kinetics because of one or more of the following effects: (a) acid molecules with specific adsorption much lower than that of phosphoric acid will leave more reaction sites active for oxygen reduction (phosphoric acid adsorbs strongly and blocks most of the reaction sites on Pt or Pt-alloy catalyst particles); (b) presence of fluorinated polymers, ionomers, and acids in the immediate vicinity of the catalyst sites enhances oxygen concentration locally to accelerate its reaction rate at the interface; and (c) optimal wetting property of the additive material(s) increases the interfacial area for oxygen reduction reaction provided flooding of the interface due to excess wetting is avoided. The additive material(s) can include material(s) with desired reactionary properties with the catalytic interface in contact with the acid found in the MEA (conventionally, phosphoric acid) which can be solid or liquid but must be stable at the desired fuel cell operating temperatures (e.g., between about 120° C. and 200° C.).

Figure 3:
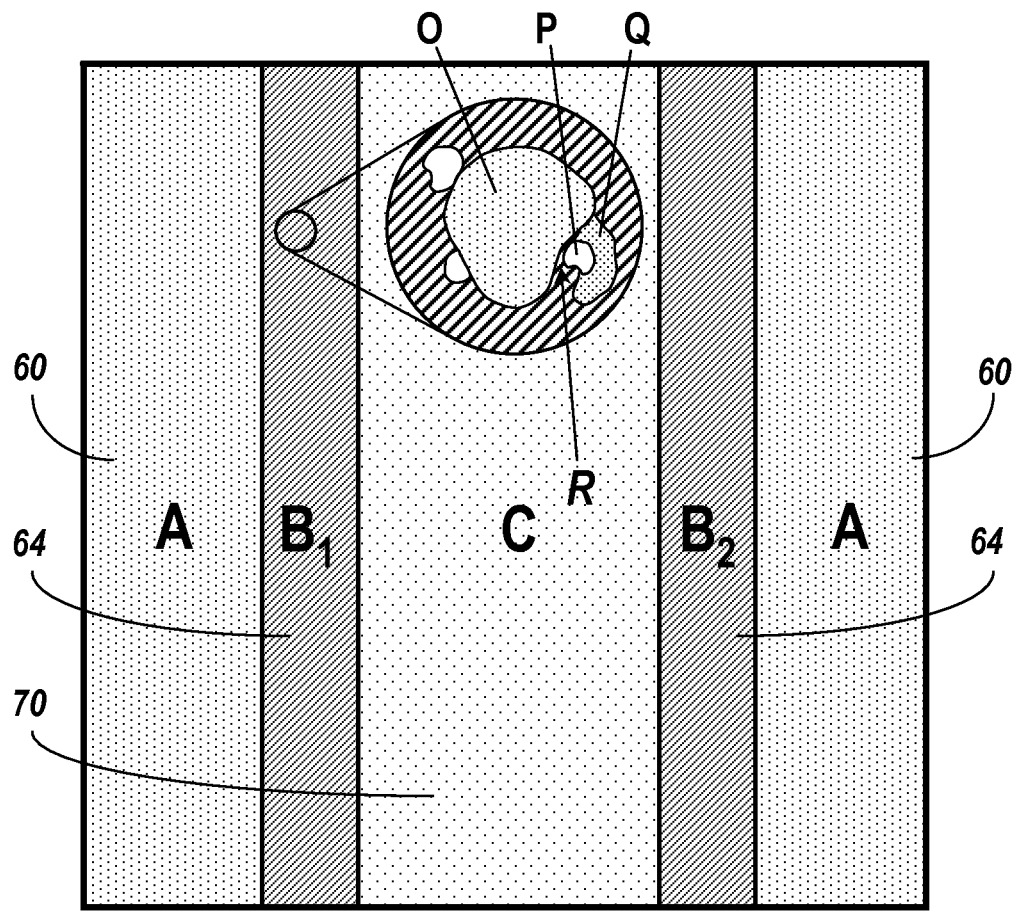
FIG. 3 is a diagrammatic illustration of an MEA interface where electro-chemical reactions occur during the operation of the fuel cell stack in accordance with one embodiment of the present invention.

FIG. 3 is a diagrammatic illustration representing the conceptual implementation of the above-described chemistry, in accordance with aspects of the present invention. As illustrated, layer A is the electrode support layer 60, layer B ($B_1$, $B_2$) is the catalyst layer 64, and layer C is the PEM membrane 70. The magnified portion of the catalyst layer 64 (layer B ($B_1$, $B_2$)) shows a catalyst support particle O, a catalyst particle P, and an additive material particle Q. The catalyst support particle O can be, for example, a high surface area carbon/graphite powder. The catalyst particle P can be, for example, a platinum or platinum alloy. The additive material particle Q can be, for example, one or more of the additive materials described herein.

In the electro-chemical process relied upon by the present invention, the following reactions occur at the interface shown in FIG. 3.

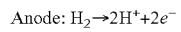

Anode: $H_2 \rightarrow 2H^+ + 2e^-$     (1)

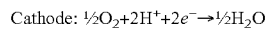

Cathode: $\tfrac{1}{2}O_2 + 2H^+ + 2e^- \rightarrow \tfrac{1}{2}H_2O$     (2)

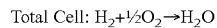

Total Cell: $H_2 + \tfrac{1}{2}O_2 \rightarrow H_2O$     (3)

As shown above, a total cell reaction (3) represents a cell reaction in an operating $H_2/O_2$ (Air) fuel cell while individual electrode reactions at the anode and the cathode are described in an anode reaction (1) and a cathode reaction (2), respectively. The anode reaction (1) takes place at the interface of the anode-PEM interface ($B_1$-C in FIG. 3), where the $H_2$ molecules dissociate to produce protons and electrons. When the anode and the cathode are electrically connected, the electrons flow through the external circuit, while the protons migrate to the cathode through ionic conduction. The $O_2$ molecules (in air) fed at the cathode meet the migrated protons and electrons at the interface of the cathode-PEM interface (C-$B_2$ in FIG. 3), where the cathode reaction (2) takes place producing $H_2O$ molecules.

In accordance with the present invention, it should be noted that the anode reaction rate is faster than the cathode reaction by orders of magnitude. For example, at a practical operating voltage (0.67 V/cell) of HT PEM fuel cell, the overvoltage (voltage loss: theoretical voltage minus the actual operating voltage) at the anode is typically <20 mV; whereas the cathode overvoltage can be >400 mV. It is established that most of this overvoltage is activation overvoltage, which means the voltage loss is due to the very slow rate of the cathode reaction. Accordingly, the present invention modifies the cathode-PEM interface to enhance the rate of oxygen reduction reaction (ORR) represented in the cathode reaction (2). This interface is further illustrated in the magnified portion of FIG. 3, where the reaction site (R) is located at the three-phase (catalyst-electrolyte-oxygen) interface, the electrolyte phase being the phosphoric acid-infused HT PEM. While intimate contact between the catalyst and the HT PEM is essential for the creation of the reactive interface (R) at their immediate contact area, extension of such reactive surface area in the depth of the catalyst layer necessitates penetration of the electrolyte phase into the catalyst structure, but without blocking the access of oxygen (air) to the reaction site (R). The optimal wetting characteristic of the catalyst layer with phosphoric acid is thus a critical requirement for optimal operation in accordance with the present invention.

As previously stated, conventional HT PEM materials have concentrated (85%-100%) phosphoric acid infused in a polymer matrix. Therefore, the cathode-PEM interface (C-$B_2$ in FIG. 3) in a HT PEM MEA essentially contains catalyst (supported or unsupported Pt or Pt-alloy) particles on the electrode side (B ($B_1$, $B_2$)) and phosphoric acid on the electrolyte side (C). A phosphoric acid molecule in equilibrium with its successively dissociated anionic species is shown in FIG. 3 and Reaction Scheme 1 herein. Strong adsorption of these species and low solubility of oxygen in phosphoric acid are considered contributing significant factors for the slow rate of ORR at the Pt-phosphoric acid interface. The addition of trifluoromethanesulfonic acid in 85% phosphoric acid results in significant enhancement of the ORR rates in the mixed acid of different composition (e.g., Enayetullah at al., J. Applied Electrochem, 18, 763, 1988); the additive acid, in addition to being weakly adsorbing on the Pt surface, has much a higher solubility of oxygen within.

In accordance with the present invention, judicious selection of additive materials to the catalyst layer is based on their weaker adsorption (on Pt) and higher oxygen solubility as compared to those in concentrated phosphoric acid. The wetting characteristic of the additive by phosphoric acid is another factor that can affect the ORR rate, more the wetability of the catalyst layer favors the creation of a larger interfacial area. However, excessive wetting of the catalyst layer causes a flooding situation, preventing access of oxygen molecules (from air) to the reaction site. The addition of Teflon particles as a non-wetting agent in the catalyst phase is necessary to minimize flooding of the interface. The present invention creates an optimal interfacial structure with the additive acidic materials (with high oxygen solubility and week specific adsorption) in immediate contact with the catalyst particles (reaction sites (R)) and the phosphoric acid, optimally wetting the additive/catalyst surface for enlarged reactive interfacial area.

Reaction Scheme 1

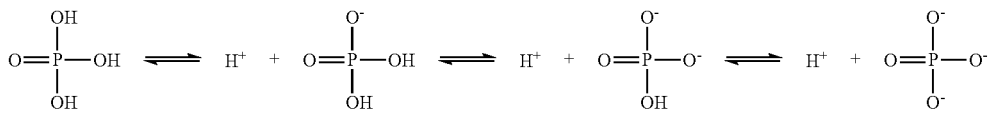

In accordance with the present invention, high performance MEAs for high temperature PEM fuel cells operating at temperatures between about 120° C. and 200° C. include concentrated phosphoric acid infused in a high temperature polymer matrix. The PEM-electrode interface structure is altered to include an additive material (or materials) together with a catalyst. The catalyst layer is typically fine particles of Platinum (Pt), or the Pt particles supported on high surface area support materials. In accordance with the present invention, the catalyst layer is modified by inclusion of the additive material(s). The additive material(s) can be in solid or liquid form, and be a particle (or particles) having desired reactionary properties with the acid in the HT PEM, and which is stable at temperatures of HT PEM fuel cell operation (e.g., 120° C. to 200° C.). Illustrative examples of such additive materials include, but are not limited to:

Fluoropolymers: Perfluoro ionomers, e.g., Nafion® and other equivalents

Phosphates: $Zr_3(PO_4)_4$, $Zr(HPO_4)_2$, $HZr_2(PO_4)_3$, $Ti(HPO_4)_2$, $KH_2PO_4$, $CsH_2PO_4$, $MgHPO_4$, $HSbP_2O_8$, $HSb_3P_2O_8$, $H_5Sb_5P_2O_{20}$, etc.

Sulfates: $MHSO_4$ (M: Li, Na, K, Rb, Cs & $NH_4$)

Polyacids: $H_3PW_{12}O_{40} \cdot nH_2O$ (n=21-29), $H_3SiW_{12}O_{40} \cdot nH_2O$ (n=21-29), $H_xWO_3$, $HSbWO_6$, $HNbO_3$, $HTiNbO_5$, $H_5Ti_4O_9$, $HSbO_3$, $H_2MoO_4$, etc.

Selenites and Arsenites: $M_3H(SeO_4)_2$ (M: Cs, Rb and NH4), $KH_2AsO_4$, $UO_2AsO_4$, etc.

Phosphides: ZrP, TiP, HfP, etc.

Oxides: $Al_2O_3$, $Sb_2O_5$, $SnO_2$, $ZrO_2$, etc.

Silicates: Zeolites, H-Natrolites, H-Mordenites, Clays, etc.

Superacids: $Sb_2F_5$, Fluorosulfonic acids, sulfonic acids, etc.

The additive material(s) can be a nano-structural material of an organic or inorganic acid, or acid salt with suitable wetting property in contact with phosphoric acid, some examples of which are included above, and others of which would be understood and identifiable by those of skill in the art, as such the above list is in no way limiting to the materials available for use in accordance with the present invention. The amount of the additive material in the catalyst layer is in the range of 1 to 15% of the catalyst weight.

With the inclusion of the additive(s), in accordance with the present invention, the resulting high temperature PEM MEAs have a power density per unit area of, for example, 180-300 mW/cm² at 0.67V with ambient pressure $H_2$/Air operating at 180° C., as compared with a conventional HT PEM MEA having a power density per unit area of 120-150 mW/cm² at 0.67V with ambient pressure $H_2$/Air operating at 180° C.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A membrane electrode assembly, comprising a high temperature proton exchange membrane disposed between an anode electrode and a cathode electrode; wherein a catalyst and at least one additive are disposed in a layer applied at an interface between the membrane and each of the anode and cathode electrodes; wherein the at least one additive comprises an organic or inorganic acid material, acid salt, fluoropolymer, perfluoroacid electrolyte, or an ionomer in an amount of between about 1% and 15% of a weight of the catalyst at the interface; wherein the additive is in immediate contact with the catalyst thereby creating enhanced reaction kinetics at the interface, including enhanced oxygen reduction kinetics at the cathode interface; and wherein the resulting assembly has a power density per unit area of between about 180 and 300 mW/cm² at 0.67V with ambient pressure $H_2$/Air operating at 180° C.

2. The assembly of claim 1, wherein the catalyst comprises platinum, or platinum-alloy particles.

3. The assembly of claim 1, wherein the catalyst particles are unsupported or supported on a high surface area conductive powder material.

4. The assembly of claim 1, wherein the at least one additive comprises a material having favorable wetting and reactionary properties with the catalyst in contact with phosphoric acid.

5. The assembly of claim 1, wherein the resulting assembly has a power density per unit area of about 200 mW/cm² 0.67V with ambient pressure $H_2$/Air operating at 180° C.

6. A method of manufacturing a membrane electrode assembly, comprising:

co-depositing a catalyst and an additive layer to an interfacing surface of a first electrode and an interfacing surface of a second electrode; and bonding or attaching the first electrode to a first side of a high temperature proton exchange membrane along the interfacing surface of the first electrode and bonding or attaching the second electrode to a second side of the high temperature proton exchange membrane along the interfacing surface of the second electrode;

wherein the additive comprises at least one additive formed of an acidic material, an ionomer, or both; wherein the additive is in immediate contact with the catalyst thereby creating enhanced reaction kinetics at each interfacing surface, including enhanced oxygen reduction kinetics at the cathode interface; and wherein the resulting assembly has a power density per unit area of between about 180 and 300 mW/cm$^2$ at 0.67V with ambient pressure H$_2$/Air operating at 180° C.

7. The method of claim 6, wherein the catalyst comprises supported or unsupported platinum.

8. The method of claim 6, wherein the catalyst comprises supported or unsupported platinum containing alloy particles.

9. The method of claim 6, wherein the additive layer comprises at least one material having favorable wetting and reactionary properties with the catalyst in contact with phosphoric acid.

10. The method of claim 6, wherein the resulting assembly has a power density per unit area of about 200 mW/cm$^2$ at 0.67V with ambient pressure H$_2$/Air operating at 180° C.

11. A membrane electrode assembly, comprising:
a high temperature proton exchange membrane disposed between an anode electrode and a cathode electrode; wherein a catalyst and at least one additive are disposed in a layer applied at an interface between the membrane and each of the anode and cathode electrodes; wherein the resulting assembly has a power density per unit area of between about 180 and 300 mW/cm$^2$ at 0.67V with ambient pressure H$_2$/Air operating at 180° C.

12. A method of manufacturing a membrane electrode assembly, comprising:
co-depositing a catalyst and an additive layer to an interfacing surface of a first electrode and an interfacing surface of a second electrode; and bonding or attaching the first electrode to a first side of a high temperature proton exchange membrane along the interfacing surface of the first electrode and bonding or attaching the second electrode to a second side of the high temperature proton exchange membrane along the interfacing surface of the second electrode;

wherein the resulting assembly has a power density per unit area of between about 180 and 300 mW/cm$^2$ at 0.67V with ambient pressure H$_2$/Air operating at 180° C.

13. The assembly of claim 11, wherein the catalyst comprises platinum, or platinum-alloy particles.

14. The assembly of claim 11, wherein the catalyst particles are unsupported or supported on a high surface area conductive powder material.

15. The assembly of claim 11, wherein the at least one additive comprises a material having favorable wetting and reactionary properties with the catalyst in contact with phosphoric acid.

16. The method of claim 12, wherein the catalyst comprises platinum, or platinum-alloy particles.

17. The method of claim 12, wherein the catalyst particles are unsupported or supported on a high surface area conductive powder material.

18. The method of claim 12, wherein the at least one additive comprises a material having favorable wetting and reactionary properties with the catalyst in contact with phosphoric acid.

* * * * *